United States Patent [19]

Riley et al.

[11] 4,086,987
[45] May 2, 1978

[54] VISCOUS FLUID CLUTCH

[75] Inventors: Michael W. Riley, Strongsville; Lane S. Duncan, Westlake; Carl E. Bochmann, Brecksville, all of Ohio

[73] Assignee: General Motors Corporation, Detroit, Mich.

[21] Appl. No.: 726,606

[22] Filed: Sep. 27, 1976

[51] Int. Cl.² .................. F16D 35/00; F16D 43/25
[52] U.S. Cl. ........................... 192/58 B; 192/82 T; 251/263; 236/99 G
[58] Field of Search ............ 192/58 B, 82 T; 251/251, 262, 263, DIG. 3; 236/99 G

[56] References Cited
U.S. PATENT DOCUMENTS

| 3,155,209 | 11/1964 | Weir | 192/82 T |
| 3,262,528 | 7/1966 | Weir | 192/58 B |
| 3,339,689 | 9/1967 | Sutaruk | 192/58 B |
| 3,419,122 | 12/1968 | Connelly | 192/58 B |
| 3,690,428 | 9/1972 | Laflame | 192/58 B |
| 3,893,555 | 7/1975 | Elmer | 192/58 B |

Primary Examiner—Allan D. Herrmann
Attorney, Agent, or Firm—John P. Moran

[57] ABSTRACT

A viscous fluid clutch including a clutch plate member rotatably mounted in the clutch housing, and serving as a rotatable wall dividing the chamber within the housing into an annular working chamber adjacent one face thereof and an annular reservoir chamber adjacent the other face thereof, with inlet and outlet ports formed in the clutch plate and a radially extending, resilient, flexible valve member mounted on the reservoir chamber face thereof for controlling the flow of fluid medium from the reservoir chamber to the working chamber through the inlet port, in response to the action of a temperature-responsive power unit mounted on the housing.

5 Claims, 6 Drawing Figures

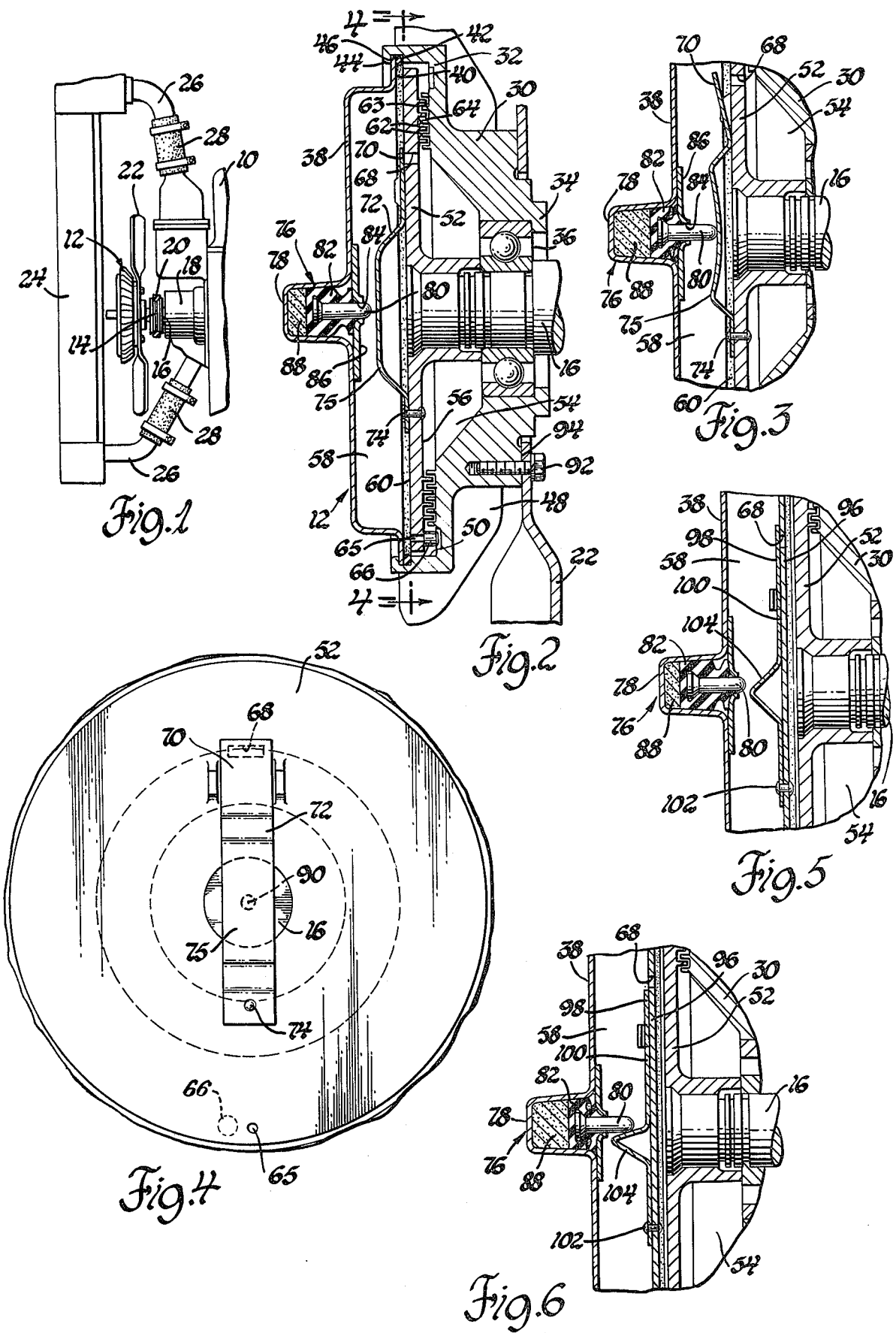

VISCOUS FLUID CLUTCH

This invention relates generally to fluid drive devices and, more particularly, to a fluid drive adapted to drive an accessory device, such as a cooling fan, for internal combustion engines.

Vehicle cooling fans are generally belt-driven from the engine crankshaft, and are operable at a fixed speed ratio with respect to the vehicle engine. It has been found desirable to vary the speed ratio of the fan with respect to the engine speed so that at low engine speed the fan will be running at a relatively high speed for maximum cooling, and as the speed of the engine increases, such as when the vehicle is running in direct drive at road speeds, the ram air cooling effect on the engine is increased and the necessity for fan cooling is diminished. The resultant lower fan speed eliminates excessive fan noise which otherwise could be disturbing to the occupants of the vehicle.

Cooling fans in use with automotive internal combustion engines today generally include either flexible blades, whose pitch varies with speed, or rigid blades normally mounted on a viscous fluid—filled, shear-drive clutch, wherein a fluid medium functions in response to ambient temperature changes to transmit torque between relatively rotatable input and output members by variably filling a predetermined shear space therebetween with a suitable fluid medium. The range is from a completely full, or so called "engaged mode" condition, to a substantially empty, or "disengaged mode" condition.

The device disclosed herein relates to an engine cooling fan mechanism wherein a viscous fluid, shear-type clutch is utilized to transmit power from the vehicle engine to the fan blade assembly. Generally, in such a device there is included a fixed pump plate dividing a reservoir chamber from a working or operating chamber, with a clutch plate being rotatably mounted in the latter chamber.

A general object of the invention is to provide an improved viscous fluid clutch wherein the manner in which the reservoir and working chambers are separated is simplified.

Another object of the invention is to provide an improved viscous fluid, shear-type clutch wherein the usual fixed pump plate is eliminated and the rotatable clutch plate serves as both a drive member and a dividing wall between the reservoir chamber and the shear space in the working chamber, with the valve member being mounted on the clutch plate and adapted to being flexed to an open position by a temperature-responsive wax-piston power unit mounted on the housing cover member.

A more specific object of the invention is to provide a viscous fluid clutch comprising a drive shaft, a clutch housing rotatably mounted on the drive shaft and surrounding a clutch plate secured to an end of the drive shaft, the clutch plate serving to divide the chamber within the housing into an operating chamber and a reservoir chamber, a fluid shear space bounded by interdigitated annular elements formed in adjacent surfaces of the clutch plate and housing in the operating chamber and operable with a fluid medium to provide a shear-type fluid between the clutch plate and the housing, an outlet opening and an inlet opening formed at respective radially outer and inner portions of the clutch plate, pump means formed on the wall of the housing to pump the fluid medium from the operating chamber through the outlet opening to the reservoir chamber, a radially extending, resilient, flexible valve member mounted on the clutch plate in the reservoir chamber and having a free end portion resiliently urged towards the surface of the clutch plate to normally close the inlet opening, and temperature-responsive axially movable piston means mounted on the housing and extending into the reservoir chamber for flexing an intermediate portion of the valve member with respect to the surface of the clutch plate to deflect the free end portion away from the inlet opening to control the flow of fluid medium therethrough from the reservoir chamber to the operating chamber in response to changes in ambient temperature.

Still another object of the invention is to provide an alternate viscous fluid clutch embodiment wherein the usual fixed pump plate is included as the divider wall between the reservoir and operating chambers, with a radially extending, resilient valve member being mounted thereon and having an inverted V-shaped central projection formed in the vicinity of the axis of the clutch, adapted to at times being engaged by a housing cover-mounted temperature-responsive wax-piston power unit such that the valve end of the valve member is caused to slide radially inwardly, off the outlet port from the reservoir chamber to the operating chamber, thereby permitting the fluid medium to flow therebetween to effectuate the fluid-shear drive.

These and other objects and advantages will become apparent when reference is made to the following description and accompanying drawings wherein:

FIG. 1 is a fragmentary side elevational view of an engine mounted viscous fluid clutch embodying the invention;

FIG. 2 is an enlarged cross-sectional view of viscous fluid fan clutch embodying the invention;

FIG. 3 is a fragmentary cross-sectional view showing the component of FIG. 2 in one operational condition;

FIG. 4 is a cross-sectional view taken along the plane of line 4—4 of FIG. 2 and looking in the direction of the arrows;

FIG. 5 is a fragmentary cross-sectional view of an alternate embodiment of the invention; and FIG. 6 is a fragmentary cross-sectional view of the FIG. 5 arrangement in one operational condition.

Referring to the drawings in greater detail, FIG. 1 illustrates an engine 10 having a viscous front clutch 12 and a pulley 14 mounted on a drive shaft 16 extending from a conventional water pump 18, the pulley 14 being rotated by a V-belt 20 connected to the crankshaft (not shown) for driving a cooling fan 22 secured to the clutch 12. The clutch 12 and the cooling fan 22 are located between the engine 10 and a radiator 24. The usual conduits 26 and associated hoses 28 communicate between the radiator 24 and the engine 10 adjacent the water pump 18.

Referring now to FIG. 2 the fluid clutch 12 includes a housing or output member 30 which includes a rear wall member 32 having a hub 34 which is rotatably mounted by a suitable bearing 36 on the drive shaft 16. The housing 30 further includes a cover or front wall member 38 which has an annular flat surface 40 formed adjacent its peripheral edge, the latter and a suitable seal 42 being confined by an annular lip 44 in an annular recess 46 formed in the housing 30. Cooling fins 48 are formed on the outer surfaces of the rear wall member 32.

A second annular recess 50 is formed in the housing 30, radially inward of the outer periphery of the annular recess 46, a clutch plate 52 is secured at its center by any suitable means to the drive shaft 16. The clutch plate 52 thus serves as a rotatable divider wall, providing a working or operating chamber 54 with the rear wall member 32 adjacent one face 56 thereof, and providing a reservoir chamber 58 with the cover member 38 adjacent the other face 60 thereof.

Adjacent portions of the clutch plate 52 and the rear wall member 32 are provided with torque-transmitting elements consisting of interdigitated annular grooves 62, and 63, respectively, with an intervening fluid shear space 64 therebetween to accommodate a suitable viscous fluid, such as silicone, as a torque-transmitting medium.

A pump outlet opening or port 65 is formed in the clutch plate 52 adjacent the outer peripheral edge thereof for cooperation with a circumferentially adjacent dam or pump element 66 formed on one of the clutch plate 52 or the outer wall 32. The pump element 66 may consist of a circular boss formed by any suitable means, such as stamping, or it may be a rectangular-shaped or other-shaped member secured by welding. An inlet opening or port 68 is formed through the clutch plate 52 radially inwardly of the annular grooves 62. The inlet port 68 is at times closed off by a valve member 70 formed on one end of a radially extending resilient, flexible member 72 spanning across the center of the reservoir chamber 58 and secured at the other end thereof by a suitable fastener, such as a rivet 74. The portion 75 of the member 72 intermediate the valve and rivet ends, 70 and 74, respectively, is raised in a U-shape away from the surface 60 of the clutch plate 52.

A temperature-responsive power unit 76 is mounted in a pocket or cavity 78 formed in the cover member 38. The temperature-responsive power unit 76 includes a thrust member 80 retained within a suitable seal 82 in the pocket 78 and extended through an opening 84 formed in a wall member 86 secured to the cover member 38 in the reservoir chamber 58 across the opening into the pocket 78. A suitable temperature-responsive medium, such as wax 88, is confined in the pocket 78 adjacent the outer end of the thrust member 80 and the seal 82. The inner end of the thrust member 80 is positioned adjacent a point 90 (FIG. 4) on the raised portion 75 of the member 72.

OPERATION

As is well known to those skilled in the fluid clutch art, open rotation of the clutch plate 52 by the input shaft 16, via the pulley 14, torque is transmitted to the adjacent housing or output member 30 by the shear action of the fluid medium in the working chamber 54. Rotation of the output member or housing 30 effects rotation of the cooling fan 22 secured by bolts 92 to a mounting surface 94 formed on the housing 30, the speed thereof being influenced by the shear drive of the variable volume of fluid medium in the working chamber 54.

The latter chamber 54 is substantially emptied by virtue of the fluid medium being pumped through the continuously open pump outlet opening 65 by the action of the pump element 66 serving as a dam or wiper, forcing the fluid to flow into the opening 65 and, thence, into the adjacent reservoir chamber 58. Under this condition, commonly known as the "disengaged mode", the slip between the clutch plate 52 and the housing 30 is greatest, and the fan 22 speed is correspondingly low.

Once ambient temperature increases to a predetermined level, the wax 88 expands in the pocket 78, forcing the thrust element 80 inwardly through the opening 84 into contact with the point 90 of the leaf spring member 72. Continued movement of the thrust element 80 serves to depress or bow the leaf spring element 72, as shown in FIG. 3 and, by causing the valve 70 end to be raised from the inlet opening 68, permits fluid from the reservoir chamber 58 to flow through the opening 68 back into the operating chamber 54 until the annular levels in the chambers 54 and 58 are at the same level i.e., radially inwardly of the cooperating annular shear grooves 62 and 63, at which time the housing 30 and, hence, the fan 22 rotated at a minimal slip-speed with respect to clutch plate 52, thereby effecting a so-called "engaged mode" or maximum cooling function.

So long as the inlet port 68 in the clutch plate 52 remains open a fluid circulation process will prevail, i.e., the rotating pump outlet opening 65 and the cooperating pump element 66 will continue to promote the flow of fluid from the working chamber 54 through the opening 65 into the reservoir chamber 60, from whence it will continue to return to the operating chamber 54 via the open inlet port 68.

In the embodiment shown in FIGS. 5 and 6, a conventional fixed pump plate 96 is confined by the annular flat surface 40 of the cover member 38 in the annular recess 46 of the housing 30. In this embodiment, the outlet opening 65 and the pump inlet opening 68 are formed in the fixed pump plate 96 rather than in the rotating clutch plate 52 of the FIG. 2 arrangement. Correspondingly, the pump or dam element 66 is formed on the clutch plate 52 in FIG. 5, rather than on the rear wall member 32, as shown in FIG. 2.

A valve member 98 is formed on the end of a radially extending, resilient, flexible member 100 for at times closing off the pump outlet opening 68. The member 100 extends across the center of the pump plate 96 in the reservoir chamber 58 and is secured at the end opposite the valve member 98 to the pump plate 96 by a rivet 102. A raised V-shaped segment 104 is formed in a central portion of the member 100 adjacent the inner end of the thrust member 80. As the wax 88 expands in response to increased ambient temperature, the thrust member 80 is urged inwardly, into contact with the adjacent side of the V-shaped segment 104, as shown in FIG. 6, causing the contacted side of the V segment to be urged toward the fixed or rivet end 102. This serves to slide the valve member 98 radially inwardly, away from the outlet opening 68 in the pump plate 96, thereby permitting fluid from the reservoir chamber 58 to flow back into the operating chamber 54 in the manner described above relative to the FIGS. 1-4 embodiment.

It should be apparent that the invention provides a simplified fluid clutch arrangment wherein, in one embodiment the rotating clutch plate serves as a divider wall between working and reservoir chambers, and accommodates inlet and outlet ports therebetween, as well as an axially deflectable valve member for controlling flow through the inlet port in cooperation with an axially operable temperature-responsive power unit, and, in another embodiment, a radially slidable valve member is mounted on a fixed pump plate and operable in response to the action of the axially operable temperature responsive power unit.

While but two embodiments of the invention have been shown and described, other modifications thereof are possible.

What is claimed is:

1. A viscous fluid clutch comprising a drive shaft having an axis of rotation, a clutch housing rotatably mounted on said drive shaft and having an operating chamber and a reservoir chamber generally symmetrical about the axis of the shaft, divider means between said operating and reservoir chambers and including a clutch plate secured to said drive shaft and having a fluid shear space bounded by interdigitated annular elements formed in adjacent surfaces of said clutch plate and housing in said operating chamber and operable with a fluid medium to provide a shear-type fluid drive between said clutch plate and said housing, outlet and inlet means formed at respective radially outer and inner portions of said divider means, pump means operatively connected to said divider means for pumping said fluid medium from said operating chamber through said outlet means to said reservoir chamber, a radially extending, resilient flexible valve member secured at one end thereof to said divider means on the reservoir chamber side thereof and having a free end portion resiliently urged towards a closed position on said inlet means, and temperature responsive, axially movable power means mounted on said housing and extending into said reservoir chamber for at times contacting and distorting an intermediate portion of said valve member to thereby move the free end portion away from said inlet means to control the flow of said fluid medium therethrough from said reservoir chamber to said operating chamber in response to changes in ambient temperature.

2. A viscous fluid clutch comprising a drive shaft having an axis of rotation, a clutch housing rotatably mounted on said drive shaft and having an annular chamber generally symmetrical about the axis of the shaft, a clutch plate secured to said drive shaft within said annular chamber and serving to divide said annular chamber into an operating chamber portion and a reservoir chamber portion axially spaced in relation thereto, a fluid shear space bounded by interdigitated annular elements formed in adjacent surfaces of said clutch plate and housing in said operating chamber portion and operable with a fluid medium to provide a shear-type fluid drive between said clutch plate and said housing, an outlet opening and an inlet opening formed at respective radially outer and inner portions of said clutch plate, pump means formed on one of said housing or said clutch plate to pump said fluid medium from said operating chamber portion through said outlet opening to said reservoir chamber portion, a radially extending, resilient, flexible valve member mounted on said clutch plate in said reservoir chamber portion and having a free end portion resiliently urged towards said clutch plate to normally close said inlet opening, and temperature-responsive, axially movable power means mounted on said housing and extending into said reservoir chamber portion for flexing an intermediate portion of said valve member with respect to said clutch plate to deflect the free end portion away from said inlet opening to control the flow of said fluid medium therethrough from said reservoir chamber portion to said operating chamber portion in response to changes in ambient temperature.

3. A viscous fluid clutch comprising a drive shaft having an axis of rotation, a clutch housing rotatably mounted on said drive shaft and having an annular chamber generally symmetrical about the axis of the shaft, a clutch plate secured to said drive shaft within said annular chamber and serving to divide said annular chamber into an operating chamber portion and a reservoir chamber portion axially spaced in relation thereto, a fluid shear space bounded by interdigitated annular elements formed in adjacent surfaces of said clutch plate and housing in said operating chamber portion and operable with a fluid medium to provide a shear-type fluid drive between said clutch plate and said housing, an outlet opening and an inlet opening formed at respective radially outer and inner portions of said clutch plate, pump means formed on said clutch plate to pump said fluid medium from said operating chamber portion through said outlet opening to said reservoir chamber portion, a radially extending, resilient, flexible valve member mounted on said clutch plate for rotation therewith in said reservoir chamber portion and having a contoured central portion raised toward said housing and a free valve end portion resiliently urged towards said clutch plate to normally close said inlet opening, and temperature-responsive, axially movable power means mounted on said housing and extending into said reservoir chamber portion for contacting a central point of said contoured central portion and flexing said contoured central portion of said valve member toward said clutch plate to thereby deflect the free valve end portion away from said inlet opening to control the flow of said fluid medium therethrough from said reservoir chamber portion to said operating chamber portion in reponse to predetermined changes in ambient temperature.

4. A viscous fluid clutch comprising a drive shaft having an axis of rotation, a clutch housing rotatably mounted on said drive shaft and having an annular chamber generally symmetrical about the axis of the shaft, a pump plate mounted within said annular chamber and serving to divide said annular chamber into an operating chamber portion and a reservoir chamber portion axially spaced in relation thereto, a clutch plate secured to said drive shaft within said operating chamber portion; a fluid shear space bounded by interdigitated annular elements formed in adjacent surfaces of said clutch plate and housing and operable with a fluid medium to provide a shear-type fluid drive between said clutch plate and said housing, an outlet opening and an inlet opening formed at respective radially outer and inner portions of said pump plate, pump means formed on said clutch plate to pump said fluid medium from said operating chamber portion through said outlet opening to said reservoir chamber portion, a radially extending, resilient, flexible valve member mounted on said pump plate in said reservoir chamber portion and having a free end portion resiliently urged towards said pump plate to normally close said inlet opening, and temperature-responsive, axially movable power means mounted on said housing and extending into said reservoir chamber portion for flexing an intermediate portion of said valve member with respect to said pump plate to slide the free end portion radially away from said inlet opening to control the flow of said fluid medium therethrough from said reservoir chamber portion to said operating chamber portion in response to changes in ambient temperature.

5. A viscous fluid clutch comprising a drive shaft having an axis of rotation, a clutch housing rotatably mounted on said drive shaft and having an annular chamber generally symmetrical about the axis of the shaft, a pump plate mounted within said annular chamber and serving to divide said annular chamber into an operating chamber portion and a reservoir chamber portion axially spaced in relation thereto, a clutch plate secured to said drive shaft within said operating chamber portion; a fluid shear space bounded by interdigitated annular elements formed in adjacent surfaces of said clutch plate and housing and operable with a fluid medium to provide a shear-type fluid drive between said clutch plate and said housing, an outlet opening and an inlet opening formed at respective radially outer and inner portions of said pump plate, pump means formed on said clutch plate to pump said fluid medium from said operating chamber portion through said outlet opening to said reservoir chamber portion, a radially extending, resilient, flexible valve member mounted on said pump plate in said reservoir chamber portion and having a folded central portion extended toward said housing and a free valve end portion resiliently urged towards said pump plate to normally close said inlet opening, and temperature-responsive, axially movable power means mounted on said housing and extending into said reservoir chamber portion for contacting a side of said folded central portion of said valve member and moving said side to thereby slide the free valve end portion radially away from said inlet opening to control the flow of said fluid medium therethrough from said reservoir chamber portion to said operating chamber portion in response to predetermined changes in ambient temperature.

* * * * *